United States Patent Office 3,141,892
Patented July 21, 1964

3,141,892
2-[α-(NITROALKYL)HETEROCYCLIC-METHYLTHIO]ETHYLAMINES
Robert C. Tweit, Wilmette, Ill., assignor to G. D. Searle & Co., Chicago, Ill., a corporation of Delaware
No Drawing. Filed Mar. 16, 1962, Ser. No. 180,334
8 Claims. (Cl. 260—329)

This invention relates to [α-(nitroalkyl)-heterocyclic-methylthio]alkylamines and processes for the manufacture thereof. More particularly, this invention relates to novel useful chemical compounds of the formula

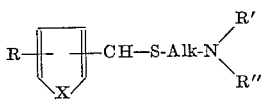

wherein R represents hydrogen, halogen, or an alkyl group; R' and R" each represent hydrogen or an alkyl group; Alk and Alk' each represent an alkylene group; and X represents oxygen or sulfur.

The halogens represented by R in the formula are fluorine, chlorine, bromine, and iodine, among which chlorine and bromine are preferred.

The alkyl groups represented by R, R', and R" are optimally lower alkyl groups, which is to say methyl, ethyl, propyl, isopropyl, butyl, isobutyl, sec-butyl, tert-butyl, pentyl, neopentyl, hexyl, isohexyl, heptyl, and like saturated, acyclic, straight- or branched-chain, monovalent, hydrocarbon radicals of the formula $$-C_nH_{2n+1}$$

wherein $n$ represents a positive integer less than 8.

Likewise the alkylene groups represented by Alk and Alk' are most desirably of lower order and, in the case of Alk, separate the groups attached thereto by at least 2 carbon atoms. Illustrative of such groups are ethylene, trimethylene, propylene, tetramethylene, 2-methyl-1,2-propylene, pentamethylene, 2,2-dimethyl-1,3-propylene, and like saturated, acyclic, straight- or branched-chain, divalent, hydrocarbon radicals of the formula $$-C_nH_{2n}-$$

wherein $n$ is defined as before.

Equivalent to the foregoing basic amines of this invention for the purposes herein disclosed are non-toxic acid addition salts thereof, the compositions of which are symbolized by

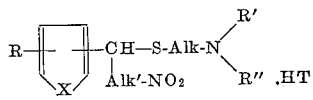

wherein R, R', R", Alk, Alk', and X retain the meanings previously assigned and T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Thus, for example, they are antibiotics variously effective against bacteria such as *Bacillus subtilis*, *Diplococcus pneumoniae*, and *Escherichia coli*; fungi such as *Trichophyton mentagrophytes* and *Candida albicans*; algae such as *Chlorella vulgaris*; and cotyledenous seed germination. They also manifest anti-hypertensive, anti-hypercholesterolemic, and anti-inflammatory activity.

Manufacture of the subject compounds proceeds by contacting an appropriate nitroalkene.

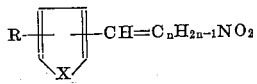

with a selected aminoalkylthio hydrochloride

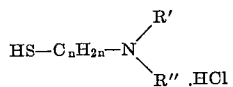

in an inert solvent medium and catalyzed by a trace of strong base, R, R', R", X, and $n$ in the latter two formulas being defined as before. The hydrochloride salt which results is converted to the corresponding base by alkalization; and the base, in turn, upon simple admixture with one equivalent of any of various inorganic and strong organic acids wherein the anionic constituent is defined by T above, affords the corresponding salt.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*2-(α-nitromethyl-3-thenylthio)ethylamine hydrochloride.*—A solution of approximately 31 parts of 3-(2-nitrovinyl)thiophene, 23 parts of 2-aminoethylthiol hydrochloride, and 1 part of pyrrolidine in a mixture of 48 parts of methanol and 140 parts of anhydrous ether is chilled to the point of crystallization. The product thrown down is filtered off, dried in air, and recrystallized from methanol to give 2-(α-nitromethyl-3-thenylthio)ethylamine hydrochloride melting at approximately 141–142°, and having the formula

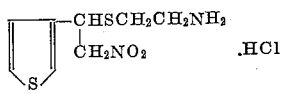

EXAMPLE 2

*2-[α-(1-nitroethyl)-2-thenylthio]ethylamine hydrochloride.*—To a solution of 68 parts of 2-(2-nitropropenyl)thiophene, 46 parts of 2-aminoethylthiol hydrochloride, and 3 parts of pyrrolidine in 240 parts of methanol is added sufficient anhydrous ether to induce precipitation. The precipitate, filtered off and dried in air, melts at 125–128°. The product thus obtained is 2-[α-(1-nitroethyl)-2-thenylthio]ethylamine hydrochloride, having the formula

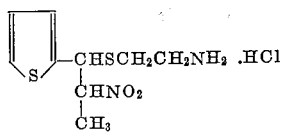

EXAMPLE 3

*2-[α-(1-nitropropyl)-2-thenylthio]ethylamine hydrochloride.*—Substitution of 74 parts of 2-(2-nitro-1-butenyl)thiophene for the 2-(2-niropropenyl)thiophene called for in Example 2 affords, by the procedure there detailed, 2-[α-(1-nitropropyl) - 2 - thenylthio]ethylamine hydrochloride, having the formula

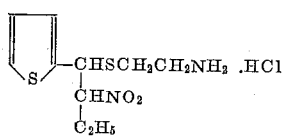

EXAMPLE 4

*2-(3-methyl-α-nitromethyl - 2 - thenylthio)ethylamine hydrochloride.*—Substitution of 68 parts of 3-methyl-2-(2-nitrovinyl)thiophene for the 2-(2-nitropropenyl)thiophene called for in Example 2 affords, by the procedure there detailed, 2-(3-methyl-α-nitromethyl-2-thenylthio)-ethylamine hydrochloride, having the formula

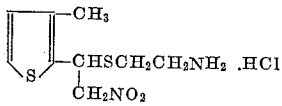

EXAMPLE 5

*2-(5-ethyl-α-nitromethyl - 2 - thenylthio)ethylamine hydrochloride.*—A solution of approximately 23 parts of 5-ethyl-2-(2-nitrovinyl)thiophene, 15 parts of 2-aminoethylthiol hydrochloride, and 1 part of pyrrolidine in a mixture of 48 parts of methanol and 252 parts of anhydrous ether is chilled to the point of precipitation. The precipitate is filtered off, dried in air, and recrystallized from methanol to afford 2-(5-ethyl-α-nitromethyl-2-thenylthio)ethylamine hydrochloride melting at approximately 131–132°, and having the formula

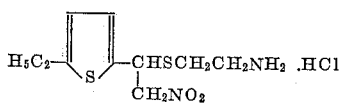

EXAMPLE 6

*2-(5-chloro-α-nitromethyl - 2 - thenylthio)ethylamine hydrochloride.*—A solution of 39 parts of 5-chloro-2-(2-nitrovinyl)thiophene, 23 parts of 2-aminoethylthiol hydrochloride, and 1 part of pyrrolidine in a mixture of 80 parts of methanol and 70 parts of anhydrous ether is chilled to the point of precipitation. The precipitate thrown down is filtered off and dried in air. The material thus isolated is 2-(5-chloro-α-nitromethyl-2-thenylthio)ethylamine hydrochloride melting at 157–161° (with decomposition), and having the formula

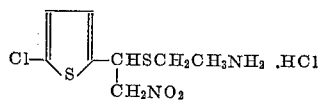

EXAMPLE 7

*N,N-diethyl-2-[(α-nitromethyl) - 2 - thenylthio]ethylamine hydrochloride.*—Substiution of 40 parts of 2-diethylaminoethylthiol hydrochloride for the 2-aminoethylthiol hydrochloride called for in Example 1 affords, by the procedure there detailed, N,N-diethyl-2-[(α-nitromethyl)-2-thenylthio]ethylamine hydrochloride, having the formula

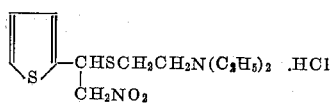

EXAMPLE 8

*2 -( α - nitromethylfurfurylthio)ethylamine hydrochloride.*—To a solution of 140 parts of 2-(2-nitrovinyl)furane, 114 parts of 2-aminoethylthiol hydrochloride, and 5 parts of pyrrolidine in 320 parts of methanol is added sufficient anhydrous ether to induce precipitation. The precipitate is filtered off, dried in air, and recrystallized from methanol to give 2-(α-nitromethylfurfurylthio)ethylamine hydrochloride melting at approximately 139–140°, and having the formula

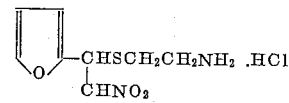

What is claimed is:
1. A compound of the formula

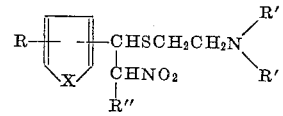

wherein R represents a member of the class consisting of hydrogen, chlorine, and a lower alkyl group; R' and R" each represent a member of the class consisting of hydrogen and a lower alkyl group; and X represents a member of the class consisting of oxygen and sulfur.
2. 2-(α-nitromethyl-3-thenylthio)ethylamine.
3. A compound of the formula

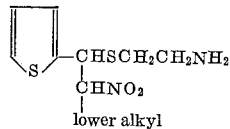

4. 2-[α-(1-nitroethyl)-2-thenylthio]ethylamine.
5. A compound of the formula

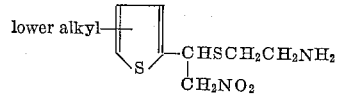

6. 2-(5-ethyl-α-nitromethyl-2-thenylthio)ethylamine.
7. 2-(5-chloro-α-nitromethyl-2-thenylthio)ethylamine.
8. 2-(α-nitromethylfurfurylthio)ethylamine.

References Cited in the file of this patent

Chem. Abstracts, vol. 50, p. 9452 (1956), abstracting Protiva, QD 1 A51.

Chem. Abstracts, vol. 51, p. 8060 (1957), abstracting Mndzhayan et al., QD 1 A51.

Chem. Abstracts, vol. 51, p. 16930 (1957), abstracting Zetler, QD 1 A51.

Chem. Abstracts, vol. 54, p. 7674 (1960), abstracting Mndzkayan et al., QD 1 A51.

UNITED STATES PATENT OFFICE
CERTIFICATE OF CORRECTION

Patent No. 3,141,892          July 21, 1964

Robert C. Tweit

It is hereby certified that error appears in the above numbered patent requiring correction and that the said Letters Patent should read as corrected below.

Column 1, line 9, for "-(nitroalkyl)-heterocyclic-" read --- -(nitroalkyl)heaterocyclic- ---; same column 1, lines 13 to 17, the formula should appear as shown below instead of as in the patent:

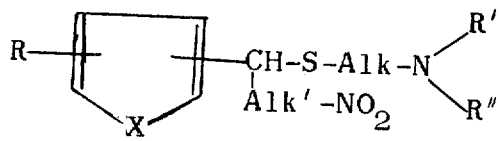

column 2, line 70, for "-(-niropropenyl)" read --- -(2-nitropropenyl) ---; column 3, lines 48 to 52, the formula should appear as shown below instead of as in the patent:

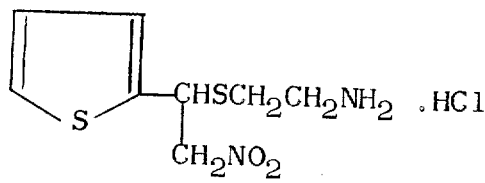

column 4, line 3, for "-(2-nitrovinyl)" read -- -(2-nitrovinyl)- ---; line 8, for "-(α-nitromethylfurfurylthio)" read --- -(α-nitromethylfurfurylthio)- ---.

Signed and sealed this 1st day of December 1964.

(SEAL)
Attest:

ERNEST W. SWIDER
Attesting Officer

EDWARD J. BRENNER
Commissioner of Patents